United States Patent
Xu et al.

(10) Patent No.: US 11,494,326 B1
(45) Date of Patent: Nov. 8, 2022

(54) PROGRAMMABLE COMPUTATIONS IN DIRECT MEMORY ACCESS ENGINE

(71) Applicant: Amazon Technologies, Inc., Seattle, WA (US)

(72) Inventors: Kun Xu, Austin, TX (US); Ron Diamant, Santa Clara, CA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 17/301,273

(22) Filed: Mar. 30, 2021

(51) Int. Cl.
  *G06F 13/28* (2006.01)
  *G06F 7/544* (2006.01)
  *G06N 3/063* (2006.01)
  *G06N 3/06* (2006.01)

(52) U.S. Cl.
  CPC ............ *G06F 13/28* (2013.01); *G06F 7/5443* (2013.01); *G06N 3/06* (2013.01); *G06N 3/063* (2013.01)

(58) Field of Classification Search
  CPC ........ G06F 7/5443; G06F 13/28; G06N 3/063
  See application file for complete search history.

(56) References Cited

U.S. PATENT DOCUMENTS

| | | | | |
|---|---|---|---|---|
| 2018/0113708 | A1* | 4/2018 | Gorbal | G06F 7/5443 |
| 2018/0157966 | A1* | 6/2018 | Henry | G06N 3/063 |
| 2019/0057036 | A1* | 2/2019 | Mathuriya | G06F 8/41 |
| 2020/0201932 | A1* | 6/2020 | Gradstein | G06F 9/30036 |
| 2021/0304012 | A1* | 9/2021 | Persson | G11C 8/06 |

* cited by examiner

*Primary Examiner* — Zachary K Huson
(74) *Attorney, Agent, or Firm* — Weaver Austin Villeneuve & Sampson LLP

(57) ABSTRACT

To perform complex arithmetic operations in neural networks without compromising the performance of the neural network accelerator, a programmable computation unit is integrated with a direct memory access (DMA) engine that is used to exchange neural network parameters between the neural network accelerator and system memory. The DMA engine may include a calculation circuit operable to perform a multiply-and-add calculation on a set of operands, and an operand selector circuit operable to select a source for each operand of the calculation circuit. The DMA engine may also include a control circuit operable to retrieve a meta-descriptor for performing a computation, configure the operand selector circuit based on the meta-descriptor, and use the calculation circuit to perform the computation based on the meta-descriptor to generate a computation result.

20 Claims, 10 Drawing Sheets

US 11,494,326 B1

PROGRAMMABLE COMPUTATIONS IN DIRECT MEMORY ACCESS ENGINE

BACKGROUND

Neural networks can be trained using machine learning techniques to perform a certain computing task for an application. The trained neural network can then perform the computing task, for example, to generate an inference from input data. Computing tasks that neural networks can perform may include human-like functions such as visual and audial perception, natural language processing, etc.

BRIEF DESCRIPTION OF THE DRAWINGS

Various embodiments in accordance with the present disclosure will be described with reference to the drawings, in which.

DETAILED DESCRIPTION

Figure 1:
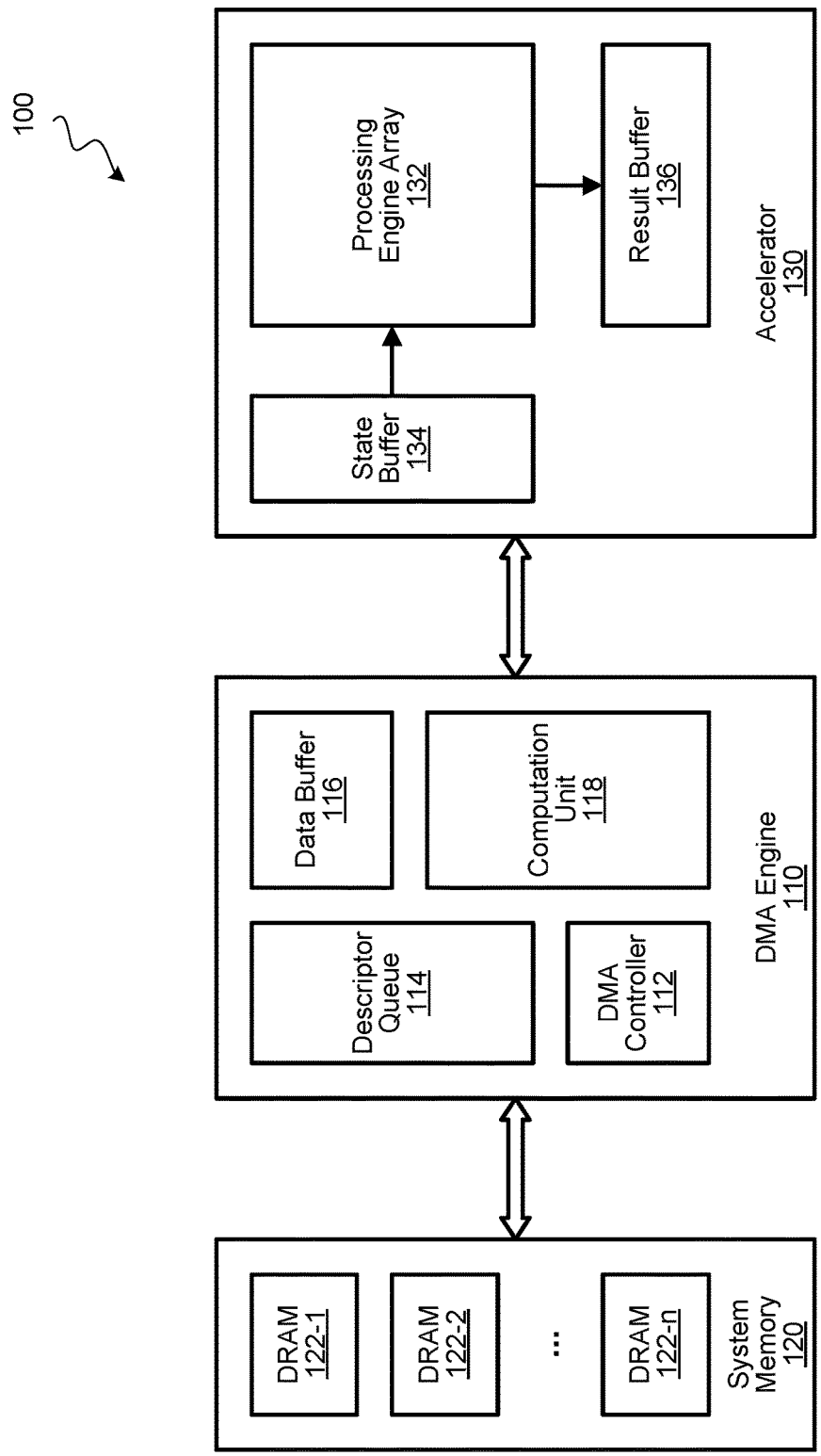
FIG. 1 illustrates an example of a computing system.

Arithmetic operations are widely used in machine learning training and inference. Examples of arithmetic operations used in neural networks may include activation function during forward propagation and cumulative computing during distributed training. Convolution neural networks (CNN) used for deep learning may involve many neural network layers. With the ever changing and improving CNN algorithms, the arithmetic operations are also becoming more and more complex. Computer architectures such as neural network accelerators that employ systolic arrays (e.g., tensor processing units) are tailored for performing parallel matrix multiplication computations commonly used in neural networks. However, programming such architectures to perform complex arithmetic operations such as reciprocal and square root can be inefficient and may decrease the teraflop throughput of such architectures.

To perform complex arithmetic operations in neural networks without compromising the teraflop performance of a neural network accelerator, a programmable computation unit can be integrated with a direct memory access (DMA) engine that is used to exchange neural network parameters between the neural network accelerator and system memory. By incorporating the computation unit in the DMA engine, complex manipulation of numeric values such as weights and gradients can be performed while these values are being read from or written to system memory. Performing these computations in the DMA engine offloads such computations from the neural network accelerator and allows such computations to be carried in parallel as the neural network accelerator is performing other tasks. Accordingly, the enhanced DMA engine not only prevents performance degradation of the neural network accelerator, the enhanced DMA engine also increases the overall teraflops performance of the system.

The computation unit integrated with the DMA engine can include multiple computational circuit blocks that perform calculations independently from each other to increase parallelism. Each of the computational circuit blocks can be highly programmable to perform complex calculations such as reciprocal, square root, and beyond. To facilitate the programmability of the computation circuit blocks, the memory descriptors used by the DMA engine to transfer data can be enhanced with meta-descriptors to configure the computational circuit block. Thus, each block of data associated with a memory descriptor being transferred by the DMA engine can be subjected to a different computation. Configuration of the computational circuit blocks are highly flexible, and computing systems incorporating such DMA engines are well-suited for the training and inference operations of complicated neural networks. Performing the computations in the DMA engine also eliminates the need to store and read back intermediate values from system memory. This eliminates memory access latencies and overhead that would otherwise be incurred when performing the computations elsewhere.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates an example of a computing system 100. Computing system 100 includes a DMA engine 110, a system memory 120, and an accelerator 130. Computing system 100 may include other components not specifically shown, such as a host processor. Accelerator 130 can be a neural network accelerator (e.g., a neural network processor, tensor processing unit, etc.), and may include a processing engine array 132 (e.g., a systolic array), a state buffer 134, and a result buffer 136. Processing engine array 132 may include an array of processing engines arranged in rows and columns. Each processing engine is capable of performing a multiply-and-add operation. State buffer 134 is used to store input data such as feature map values and weight values for processing engine array 132. During operation, the input data are shifted into processing engine array 132 from state buffer 134 along the rows of the array. The computation results of the processing engines are accumulated along the column direction, and the column output data are stored in result buffer 136.

In most instances, tensors processed by processing engine array 132 may have thousands or even millions of elements. Because not all elements of a tensor can fit within accelerator 130 at the same time, system memory 120 can be used to store data that are not currently being processed in accelerator 130. As computations are carried out, data needed by accelerator 130 can be transferred from system memory 120 into accelerator 130, and data no longer needed by accelerator 130 can be transferred from accelerator 130 to system memory 120. System memory 120 can be implemented using one or more dynamic random access memory (DRAM) devices 122-1 to 122-$n$ and/or other types of memories. In other implementations, system memory can be implemented, for example, with static random access memory (SRAM), flash memory, 3D cross-point memory, or any combination thereof.

Data transfers between system memory 120 and other components of computing system 100 may involve a host processor (not shown) to issue read and write commands to system memory 120. Such memory accesses through a host processor may incur unnecessary latency, especially when the host processor is not a consumer or generator of the data being accessed. To bypass the host processor, DMA engine 110 can be used to directly exchange data between system memory 120 and accelerator 130.

DMA engine 110 may include a DMA controller 112, a descriptor queue 114, and a data buffer 116. Furthermore, DMA engine 110 may include a computation unit 118 that can be used to offload complex computations from accelerator 130. Descriptor queue 114 can be implemented as a circular buffer or ring queue, and is configured to store a set of memory descriptors that is used by DMA engine 110 to exchange data between system memory 120 and other components of computing system 100. For example, when accelerator 130 has data to store in system memory 120 or is requesting data from system memory 120, a memory descriptor providing a source address and a destination address can be placed in descriptor queue 114 to initiate the transfer. In some implementations, DMA engine may include multiple descriptor queues. For example, DMA engine 110 may include a descriptor queue for writing data into system memory 120, and a descriptor queue for reading data from system memory 120. In some implementations, DMA engine 110 may implement multiple data transmission channels (e.g., different channels for different components of computing system 100), and each transmission channel may have its own descriptor queue or pair of descriptor queues for each transfer direction.

DMA controller 112 can be used to manage the operations of DMA engine 110. For example, DMA controller 112 can maintain head and tail pointers for descriptor queue 114 of DMA engine 110. DMA controller 112 can monitor the number of available entries in descriptor queue 114 to prevent queue overflow. In some implementations, DMA controller 112 can also maintain completion statuses and generates interrupts for component of computing system 100. DMA controller 112 may process the memory descriptors in descriptor queue 114 by obtaining data from the designated source in the memory descriptor, and placing that data in data buffer 116 in preparation for transfer to the target destination. Data buffer 116 acts as an input buffer for DMA engine 110. Data buffer 116 can be used to temporarily hold data associated with a memory descriptor that is ready for processing, while waiting for placement of data from a previous memory descriptor to complete.

Computation unit 118 can perform computations on data present in data buffer 116, and output the computation result to the intended destination based on the corresponding memory descriptor. For example, computation unit 118 may include a computational circuit block to perform programmable calculations on data being written to or read from system memory 120. In some implementations, computation unit 118 may include multiple computational circuit blocks to perform calculations in parallel. Each of the computational circuit blocks can be independently programmed, and a computational circuit block can be programmed to perform different computations for each sequential block of data being processed by the computational circuit block. This can be achieved by extending the memory descriptor for a particular data transfer to include configuration information for the computational circuit block.

Figure 2:
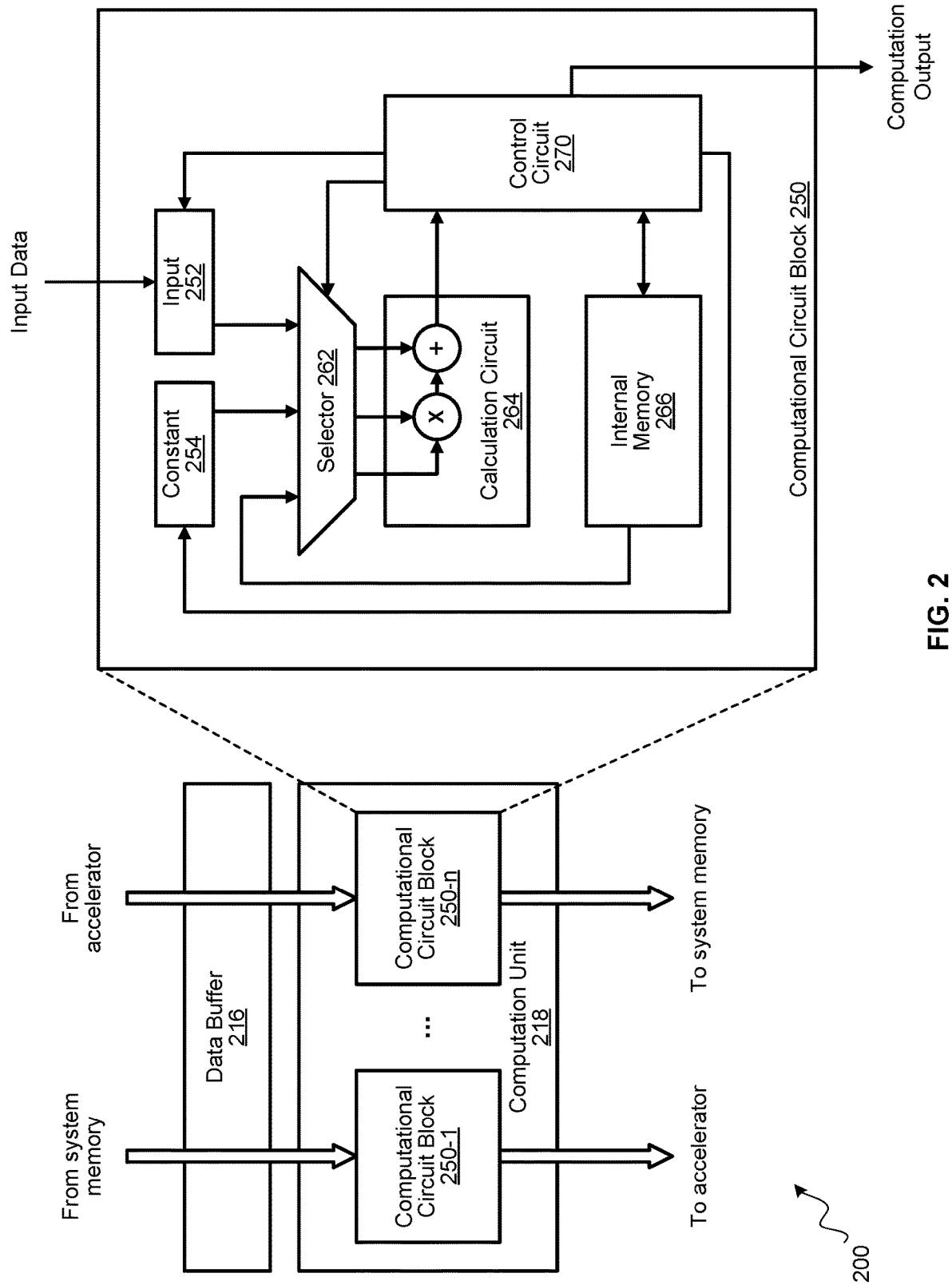
FIG. 2 illustrates a block diagram of an example of a direct memory access engine.

FIG. 2 illustrates a more detailed block diagram of an example of a portion of a DMA engine 200. DMA engine 200 can be, for example, DMA engine 110. DMA engine 200 includes a data buffer 216 that provides input data to a computation unit 218. DMA engine 200 may implement multiple data transmission channels. For example, DMA engine 200 may implement a first data transmission channel to transfer data from system memory to accelerator, and a second data transmission channel to transfer data from accelerator to system memory. In some implementations, DMA engine 200 may implement additional data transmission channels for other components that exchange data with system memory. Furthermore, additional data transmission channels can be implemented between the system memory and accelerator. For example, if the buffers in the accelerator can support simultaneous reads and/or writes (e.g., to different memory banks or partitions), then multiple data transmission channels operating in parallel can be implemented in DMA engine 200 to increase data transfer rates.

Computation unit 218 may include multiple computational circuit blocks 250-1 to 250-$n$. In some implementations, each data transmission channel may include an in-line computational circuit block to manipulate data obtained from a location corresponding to a source address, and place the manipulated data in a location corresponding to a destination address. For example, computational circuit block 250-1 can be configured to generate a computation result using data read from the system memory for placement into the state buffer of the accelerator, and computational circuit block 250-$n$ can be configured to generate a computation result using data read from the result buffer of the accelerator for placement into the system memory. Although each data transmission channel is shown as having one computational circuit block, in some implementations, a data transmission channel may include multiple computational circuit blocks. Such multiple computational circuit blocks can be coupled in series to perform sequential computations, in parallel to simultaneously perform computations on separate portions of the data being transferred or perform different computations on the same data to generate different results, or any combination thereof.

In some implementations, the allocation of the computational circuit blocks of DMA engine 200 to the data transmission channels can be dynamically adjusted, for example, based on the computational workload and data bandwidth demands of the data transmission channel. The computational circuit blocks 250-1 to 250-$n$ in computation unit 218 can be connected to each other via a set of multiplexors such that one or more of the computational circuit blocks 250-1 to 250-$n$ can select between the input data of any of the data transmission channels and/or the output of another computational circuit block to be used as the input to the computational circuit block. A host processor allocating system resources for the accelerator can configure the multiplexors to vary the number of computational circuit blocks 250-1 to 250-$n$ provided for each data channel. The allocation can be made based on the complexity of the computation to perform, data transfer bandwidth or latency requirement of the data transmission channel, etc.

Referring to the internal circuitry of computational circuit block 250, each computational circuit block 250 includes an operand selector circuit 262, a calculation circuit 264, and a control circuit 270. Calculation circuit 264 is operable to perform a multiply-and-add calculation on a set of operands. Hence, in some implementations, calculation circuit 264 may include a multiplier circuit coupled to an adder circuit to form a multiply-and-add circuit, and the multiply-and add circuit can be configured to multiply a first operand with a second operand to generate a multiplication result, and add the multiplication result to a third operand. Although the basic calculation performed by calculation circuit 264 (e.g., multiply-and-add) can be similar to a processing engine of the processing engine array of a neural network accelerator, the additional circuitry in computational circuit block 250 can program calculation circuit 264 to perform complex computations.

Operand selector circuit 262 is operable to select a source from multiple sources for each operand of calculation circuit 264. For example, operand selector circuit 262 can be configured to select a corresponding source for each of the first operand, the second operand, and the third operand of the multiple-and-add calculation. In the example of computational circuit block 250, the available sources may include an input buffer 252, a constant value buffer 254, and an internal memory 266 of computational circuit block 250. The source selection for each operand can be independent from each other, and can be performed based on a meta-descriptor of the computation being performed by computational circuit block 250. The computation being performed by computational circuit block 250 is decomposed into a series of multiply-and-add calculations. The meta-descriptor can include a set of operand descriptors to configure operand selector circuit 262 to select the proper operand sources for each of the multiple-and-add calculations of the computation. In some implementations, operand selector circuit 262 can also include sign inversion logic to invert the sign of the value stored in input buffer 252, constant value buffer 254, and/or internal memory 266 prior to providing the selected value to calculation circuit 264. Although input buffer 252, constant value buffer 254, and internal memory 266 are shown as separate components, it should be understood that in some implementations, any combination of these components can be implemented using the same storage component. For example, the same memory device may include a first portion to implement input buffer 252, a second portion to implement constant value buffer 254 and a third portion to implement internal memory 266.

Control circuit 270 is used to program computational circuit block 250 to generate a computation result from data inputted from the data buffer 216 of DMA engine 200. Control circuit 270 is operable to receive a meta-descriptor from DMA engine 200 with information about the computation, and configure operand selector circuit 262 based on the meta-descriptor. In some implementations, multiple iterations of the computation may need to be performed to generate the computation result. In such scenarios, control circuit 270 may invoke or use calculation circuit 264 to perform a number of iterations of the computation based on the meta-descriptor to generate the computation result. The computation result can be outputted after a number of iteration(s) of the computation using the calculation circuit 264 has been performed.

Figure 3:
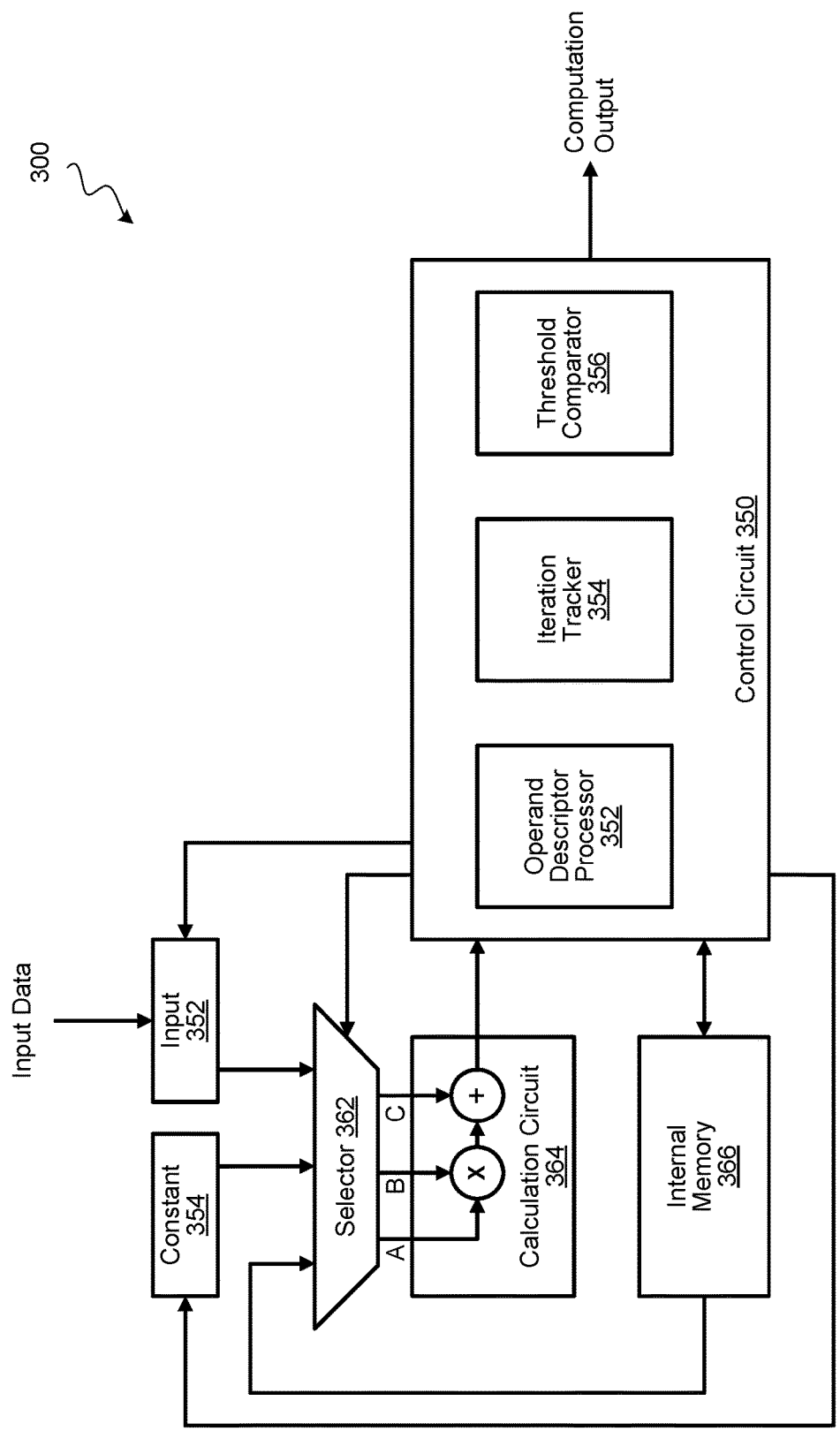
FIG. 3 illustrates a block diagram of an example of a computational circuit block.

FIG. 3 illustrates a more detailed block diagram of an example of a computational circuit block 300. Computational circuit block 300 can be, for example, computational circuit block 250. Control circuit 350 of computational circuit block 300 includes circuitry implementing an operand descriptor processor 352, an iteration tracker 354, and a threshold comparator 356.

Operand descriptor processor 352 is used to sequence through a set of operand descriptors to configure operand selector circuit 362 to select the proper sources for the operands of each multiply-and-add calculation. Iteration tracker 354 is used to track the number of iterations of performing a computation until the number of iterations meets a target number of iteration or the result satisfies a certain threshold condition. Threshold comparator 356 is used to determine whether a difference or delta between a previous iteration result of the computation and a current iteration result of the computation satisfies the threshold condition (e.g., is less than a programmable threshold value). The other components of computational circuit block 300 are similar to those of FIG. 2, and thus a detailed description of which need not be repeated. The operation of computational circuit block 300 will be described in combination with FIG. 4, which illustrates an example of the contents of a memory descriptor and meta-descriptor.

Figure 4:
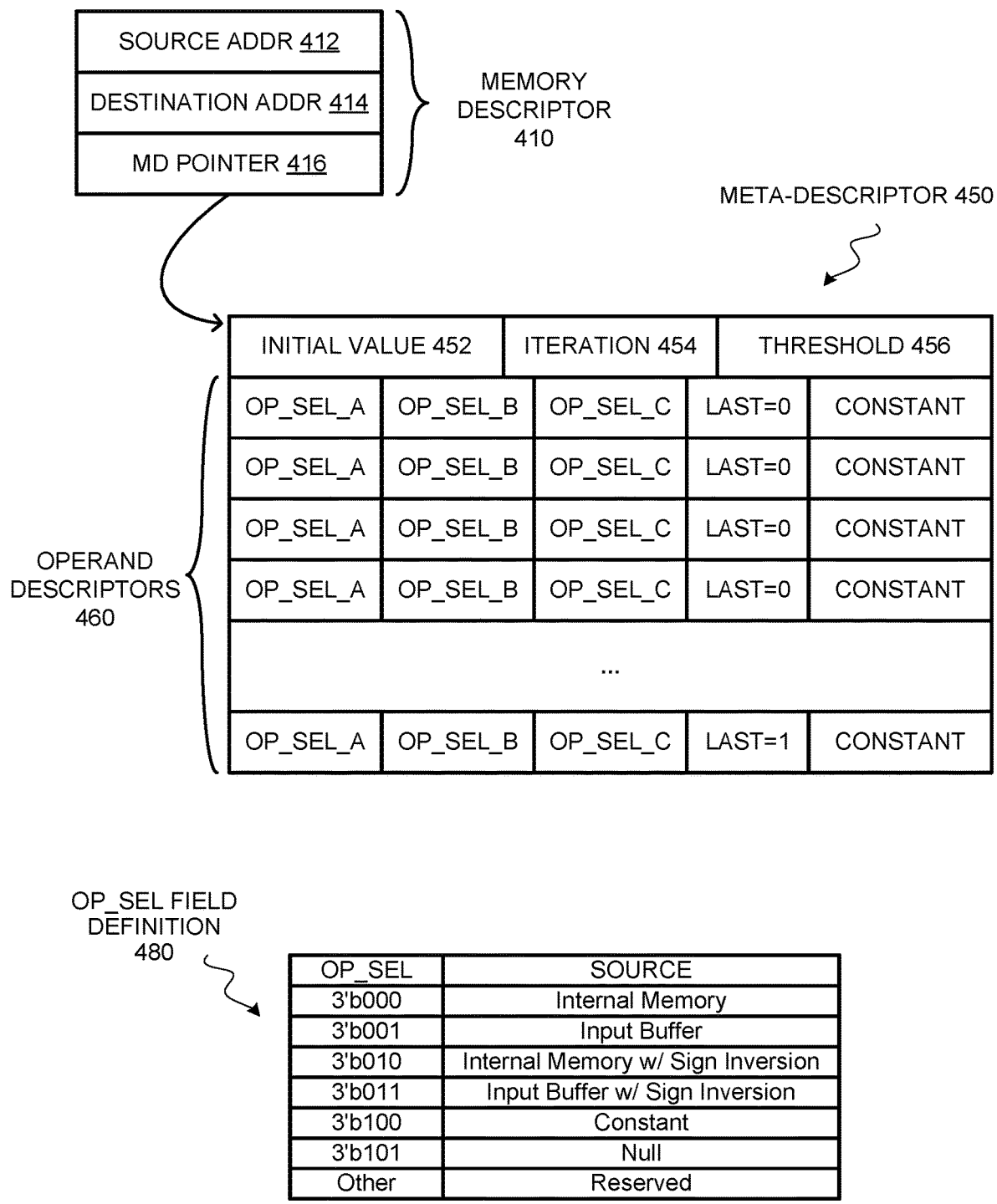
FIG. 4 illustrates an example of contents of a memory descriptor and meta-descriptor.

As discussed above, the DMA engine performs a data transfer by processing a memory descriptor. Referring to FIG. 4, a memory descriptor 410 may include a source address 412 identifying a location to read the data to be transferred, and a destination address 414 identifying a target location to write the data. Memory descriptor 410 may also include a length field (not shown) indicating the size (e.g., number of bytes) of the data being read. Because the size of the data being transferred may change due to the calculations being performed on the data, memory descriptor 410 may also include another length field (not shown) to indicate the size of the data being written to the target location. In some implementations, the size of the data being read at the source address 412 and/or the size of the data being written at the destination address 414 can be represented as a data type (e.g., 16-bit floating-point (FP16), 32-bit floating-point (FP32), etc.). In some implementations, memory descriptor 410 may also include a bypass flag indicating whether the data being read should be transferred to the target location without modification (e.g., without performing any calculations). For example, if the bypass flag is set, computational circuit block 300 can be bypassed such that the input data is written to the target location as is. The bypass path can be implemented inside computational circuit block 300, or outside computational circuit block 300 at the DMA engine level.

Memory descriptor 410 may also include a meta-descriptor 450 that provides information about the computation being performed on the data being read from the source address 414. Meta-descriptor 450 may include an initial value field 452, an iteration field 454, and a threshold value field 456. The initial value field 452 can be used to provide an initial value or a starting point for a computation. Some complex computations may involve using Newton's stepping method to iteratively perform a computation for convergence. The initial value field 452 can be used to provide the initial $X_0$ for such computations.

Iteration field 454 can be used to provide information on the number of iterations of a computation to perform. A non-zero value in iteration field 454 may indicate the target number of iterations of the computation to perform (e.g., a value of 5 means repeating the computation 5 times). A zero value in iteration field 454 may indicate an auto-iteration mode in which the computation is iteratively performed until a difference between a previous iteration result of the computation and a current iteration result of the computation satisfies a threshold. For example, when iteration field 454 is zero, the computation can be performed repeatedly until the difference or delta between the previous result and the current result is less than a threshold value indicated in threshold value field 456.

As mentioned above, a complex computation can be decomposed into a series of multiply-and-add calculations. Each of the multiply-and-add calculation for a particular computation may use different sources for the three operands of the calculation. As such, each multiply-and-add calculation of a computation can have a corresponding operand descriptor to select the proper sources for the operands of the multiply-and-add calculation step. Still referring to FIG. 4, meta-descriptor 450 may include a set of operand descriptors 460. Meta-descriptor 450 may provide an operand descriptor for each of multiply-and-add calculations, thus each row of operand descriptors 460 may correspond to an operand descriptor for a multiply-and-add calculation.

Each operand descriptor may include a first operand selector OP_SEL_A for a first operand of calculation circuit 364, a second operand selector OP_SEL_B for a second operand of calculation circuit 364, and a third operand selector OP_SEL_C for a third operand of calculation circuit 364. Each operand selector may include 3 bits to identify a source for the operand. An example of the bit definition of the operand selector field is shown in table 480. For instance, when operand selector is 3'b000, the operand is sourced from internal memory 366; when operand selector is 3'b001, the operand is sourced from input buffer 352; when operand selector is 3'b010, the operand is sourced from internal memory 366 but with the sign of the stored value inverted; when operand selector is 3'b011, the operand is sourced from input buffer 352 but with the sign of the stored value inverted; when operand selector is 3'b100, the operand is sourced from constant value buffer 354; and when operand selector is 3'b101, the operand is set to a null value that does not affect the output. For example, operands inputted to the multiplier circuit is set to 1, and the operand inputted to the adder circuit is set to zero. Other values of operand selector can be reserved. It should be understood that the bi definition of table 480 is just an example, and that other implementations may use a different encoding for the source of the operands.

Each operand descriptor may also include a constant field (CONSTANT), which can be used to provide a constant value for the multiply-and-add calculation corresponding to the operand descriptor. This can be the value that is selected with the operand selector is 3'b100. Each operand descriptor may also include a last bit (LAST) indicating whether the operand descriptor is the last operand descriptor of the meta-descriptor 450. Thus, computational circuit block 300 can be programmed to perform a certain computation based on the set of operand descriptors 460 in meta-descriptor 450, and the computation defined by the set of operand descriptors 460 can be repeated iteratively based on the iteration filed 454 to generate the computation output of computational circuit block 300.

Depending on the complexity of the computation being performed, meta-descriptor 450 can have a variable length based on the number of operand descriptors 460. Incorporating meta-descriptor 450 into memory descriptor 410 may cause the number of memory descriptors that can be stored in the descriptor queue of the DMA engine to fluctuate and complicate the queue management. As such, in some implementations, instead of incorporating meta-descriptor 450 in memory descriptor 410, a pointer 416 that points to a linked-list implementing meta-descriptor 450 can be included in memory descriptor 410 as shown in FIG. 4. This allows all memory descriptors processed by the DMA engine to have the same length, which can simplify management of the descriptor queue. In other implementations, a fixed number of available operand descriptor entries can be reserved in a memory descriptor to keep the length of the memory descriptor constant. However, such implementations may have less flexibility in terms of the number of operand descriptors that can be used, and may also result in a large number of unused bits in the memory descriptor for simple computations. Other variations are also possible. For example, the initial value field 452, iteration field 454, and threshold value field 456 can be incorporated into memory descriptor 410, and pointer 416 may point to a linked-list of operand descriptors. It should also be understood that the various fields in memory descriptor 410 and meta-descriptor 450 can be arranged and/or organized in a different manner than what is specifically shown.

Referring back to FIG. 3, when the DMA engine performs a data transfer, memory descriptor 410 corresponding to the data transfer is used to provide computational circuit block 300 with meta-descriptor 450 to configure computational circuit block 300. Initially, data read from source address 412 is placed in the data buffer of the DMA engine, and is provided as input data for input buffer 352. If the meta-descriptor has a non-zero value in initial value field 452, the non-zero value is written into internal memory 360. Iteration tracker 354 is configured with the value in iteration field 454, and threshold comparator 356 is configured with the value in threshold value field 456, for example, if iteration field 454 has a zero value.

Operand descriptor processor 352 may obtain the first operand descriptor of meta-descriptor 450. If there is a non-zero value in the constant value field, that value is stored in constant value buffer 354. Operand descriptor processor 352 then configures operand selector circuit 362 with the OP_SEL fields for the three operands. Operand selector circuit 362 selects the sources for the three operands based on the OP_SEL fields from the operand descriptor, and performs a multiply-and-add calculation (A×B)+C on the selected operands. Operand descriptor processor 352 then determines if the current operand descriptor being processor is the last operand descriptor of meta-descriptor 450 (e.g., by checking the last bit). If the current operand descriptor is not the last operand descriptor of meta-descriptor 450, then input buffer 352 is updated with the calculation result of the calculation circuit 364 such that the calculation result can be used in the next multiply-and-add calculation. Operand descriptor processor 352 then processes the next operand descriptor in a similar manner until the last operand descriptor of operand descriptors 460 is processed.

If operand descriptor processor 352 determines that the current operand descriptor being processed is the last operand descriptor, then iteration tracker 354 can determine if further iterations of the computation is to be performed. For example, if iteration field 454 from meta-descriptor 450 has a non-zero value, then iteration tracker 354 can increment an iteration counter and compare the updated iteration counter value with the target number of iterations indicated in iteration field 454. If the updated iteration counter value is less than the target number of iterations, then the result of the calculation circuit 364 (which is the current iteration result of the computation) is written to internal memory 366 such that the result can be used in the next iteration of the computation. Operand descriptor processor 352 can then process the set of operand descriptors 460 again in a similar manner for the next iteration of the computation until the iteration counter value is equal to the target number of iterations. When the iteration counter value reaches the target number of iterations, the result of the calculation circuit 364 (which is the last iteration result of the computation) is outputted as the computation result, and this computation result can be written to the location corresponding to destination address 414 to complete the DMA transfer.

If iteration field 454 from meta-descriptor 450 has a zero value to indicate auto-iteration mode, then threshold comparator 356 calculates a difference or delta between the previous iteration result of the computation and the current iteration result of the computation, and compares the difference or delta to the threshold value indicated in threshold value filed 456. If the difference or delta does not satisfy the threshold condition (e.g., is greater than or equal to the programmable threshold value), then the result of the calculation circuit 364 (which is the current iteration result of the computation) is written to internal memory 366 such that the result can be used in the next iteration of the computation. Operand descriptor processor 352 can then process the set of operand descriptors 460 again in a similar manner for the next iteration of the computation until the difference or delta satisfies the threshold condition (e.g., is less than the programmable threshold value). The result of the calculation circuit 364 is then outputted as the computation result, and this computation result can be written to the location corresponding to destination address 414 to complete the DMA transfer.

Next, several examples of generating a computation result will be described. Each example will list the intended computation result together with an example of the meta-descriptor that can be used to program computational circuit block 300.

Example 1

Generate $a^2$ from input data a
initial value=0; iteration=1; threshold=1

| OP_SEL_A | OP_SEL_B | OP_SEL_C | LAST | CONSTANT |
|---|---|---|---|---|
| Input | input | constant | 1 | 0 |

In example 1, the input value a is stored in input buffer 352, and constant value 0 is stored in constant value buffer 354. Operand selector circuit 362 selects the input value a for operands A and B of calculation circuit 364, and constant value 0 for operand C. Calculation circuit 364 then computes (a×a)+0 to generate $a^2$ as the current iteration result. The iteration counter is incremented from 0 to 1. Given the target number of iterations is 1, $a^2$ is outputted as the computation result.

Example 2

Generate 1/a from input data a
Using Newton's stepping method, the reciprocal of a can be calculated iteratively as:

$$X_{n+1} = X_n + X_n(1 - aX_n)$$

initial value=$X_0$; iteration=5; threshold=0

| OP_SEL_A | OP_SEL_B | OP_SEL_C | LAST | CONSTANT |
|---|---|---|---|---|
| input, sign inversion | internal memory | constant | 0 | 1 |
| internal memory | input | internal memory | 1 | 0 |

In example 2, the target number of iterations is set as 5, so $X_5$ will be the computation output. The initial value of $X_0$ is stored in internal memory 366. During processing of the first operand descriptor, input value a is stored in input buffer 352, and constant value 1 is stored in constant value buffer 354. Operand selector circuit 362 selects the input value −a for operand A, internal value $X_0$ for operand B, and constant value of 1 for operand C for calculation circuit 364. Calculation circuit 364 then computes (−a×$X_0$)+1 to generate (1−a$X_0$) as the calculation result.

During processing of the second operand descriptor, the prior calculation result of (1−a$X_0$) is stored in input buffer 352, and constant value of 0 is stored in constant value buffer 354. The initial value of $X_0$ is still stored in internal memory 366. Operand selector circuit 362 selects the internal value of $X_0$ for operand A, the input value (1−a$X_0$) for operand B, and internal value of $X_0$ for operand C for calculation circuit 364. Calculation circuit 364 then computes ($X_0$×(1−a$X_0$))+ $X_0$ to generate $X_0$+$X_0$(1−a$X_0$) as the calculation result. Given that this is the last operand descriptor, this calculation result is the iteration result of this first iteration. The iteration count is incremented from 0 to 1. Given that the target number of iterations has not been reached, the iteration result is stored in internal memory as $X_1$.

The two operand descriptors are processed for a second time for the next iteration to generate $X_2$, and so on. The process is performed for a total of 5 times to generate $X_5$. At this point, the iteration count reaches 5, which is the target number of iterations, and $X_5$ is then outputted as the computation result.

Example 3

Generate SORT(a) from input data a
Using Newton's stepping method, the square root of a can be calculated iteratively as:

$$X_{n+1} = X_n + \frac{X_n}{2}(1 - aX_n^2)$$

initial value=$X_0$; iteration=0; threshold=0.5

| OP_SEL_A | OP_SEL_B | OP_SEL_C | LAST | CONSTANT |
|---|---|---|---|---|
| input, sign inversion | internal memory | constant | 0 | 0 |
| internal memory | input | constant | 0 | 1 |
| Constant | input | constant | 0 | ½ |
| internal memory | input | internal memory | 1 | 0 |

In example 3, auto-iteration mode is used until the delta between iteration results is less than 0.5. The initial value of $X_0$ is stored in internal memory 366. During processing of the first operand descriptor, input value a is stored in input buffer 352, and constant value 0 is stored in constant value buffer 354. Operand selector circuit 362 selects the input value −a for operand A, internal value $X_0$ for operand B, and constant value of 0 for operand C for calculation circuit 364. Calculation circuit 364 then computes $(-a \times X_0)+0$ to generate $-aX_0$ as the calculation result for the first operand descriptor.

During processing of the second operand descriptor, the prior calculation result of $-aX_0$ is stored in input buffer 352, and constant value of 1 is stored in constant value buffer 354. The initial value of $X_0$ is still stored in internal memory 366. Operand selector circuit 362 selects the internal value of $X_0$ for operand A, the input value $-aX_0$ for operand B, and constant value of 1 for operand C for calculation circuit 364. Calculation circuit 364 then computes $(X_0 \times -aX_0)+1$ to generate $(1-aX_0^2)$ as the calculation result for the second operand descriptor.

During processing of the third operand descriptor, the prior calculation result of $(1-aX_0^2)$ is stored in input buffer 352, and constant value of 0 is stored in constant value buffer 354. The initial value of $X_0$ is still stored in internal memory 366. Operand selector circuit 362 selects the constant value of ½ for operand A, the input value $(1-aX_0^2)$ for operand B, and constant value of 0 for operand C for calculation circuit 364. Calculation circuit 364 then computes $$\left(\frac{1}{2} \times (1 - aX_0^2)\right) + 0$$

to generate $$\frac{1}{2}(1 - aX_0^2)$$

as the calculation result for the third operand descriptor.

During processing of the fourth operand descriptor, the prior calculation result of $$\frac{1}{2}(1 - aX_0^2)$$

is stored in input muter 352, and constant value of 0 is stored in constant value buffer 354. The initial value of $X_0$ is still stored in internal memory 366. Operand selector circuit 362 selects the internal value of $X_0$ for operand A, the input value $(1-aX_0^2)$ for operand B, and internal value of $X_0$ for operand C for calculation circuit 364. Calculation circuit 364 then computes $$\left(X_0 \times \frac{1}{2}(1 - aX_0^2)\right) + X_0$$

to generate $$X_n + \frac{X_n}{2}(1 - aX_n^2)$$

as the calculation result for the fourth operand descriptor. Given that this is the last operand descriptor, this calculation result is the iteration result $X_1$ of this first iteration. Being in auto-iteration mode, the difference or delta between $X_0$ and $X_1$ is compared with the threshold value of 0.5. If the delta is not less than 0.5, then the iteration result is stored in internal memory as $X_1$.

The four operand descriptors are processed for a second time for the next iteration to generate $X_2$, and the delta between $X_1$ and $X_2$ is compared with the threshold value of 0.5, and so on, until the delta is less than 0.5. The iteration result having a delta less than 0.5 is outputted as the computation result.

Figure 5:
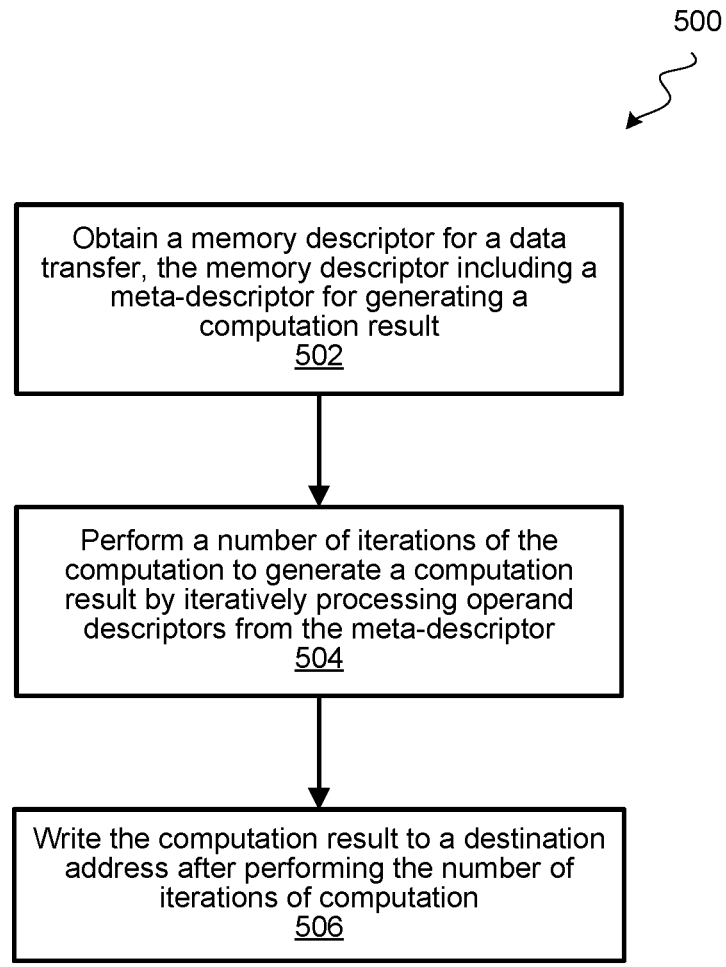
FIG. 5 illustrates a flow diagram of an example of a process to perform in-line computations when transferring data.

FIG. 5 illustrates a flow diagram of a process 500 that can be used to perform in-line computations when transferring data. Process 500 can be performed, for example, by a DMA engine that is communicatively coupled between system memory and an accelerator. Process 500 may begin at block 502 by obtaining a memory descriptor for a data transfer. The memory descriptor may include a source address, a destination address, and a meta-descriptor for generating a computation result on the data read from the source address. The meta-descriptor may include a set of operand descriptors to perform a computation involving multiple multiply-and-add calculations. The meta-descriptor may also include an iteration field to control a number of iterations of the computation to perform.

At block 504, a number of iterations of the computation is performed to generate a computation result. The computation can be performed for a target number of iterations. In some implementations, the computation is iteratively performed until a difference between a previous iteration result of the computation and a current iteration result of the computation satisfies a programmable threshold. Each iteration of the computation can be performed by processing an operand descriptor for each of the multiply-and-add calculations. Each operand descriptor is processed by selecting a source for each operand of a multiply-and-add circuit based on the operand descriptor for the corresponding multiply-and-add calculation, and performing a multi-and-add calculation on the operands of the multiply-and-add circuit.

At block 506, the computation result is written to the destination address after performing a number of iterations of the computation. In some implementations, the source address and the destination address may include a first address corresponding to a location in system memory and a second address corresponding to a location in a neural network accelerator. Thus, process 500 can be used to perform in-line computations when transferring data from system memory to the neural network accelerator, or when transferring data from the neural network accelerator to system memory.

Figure 6:
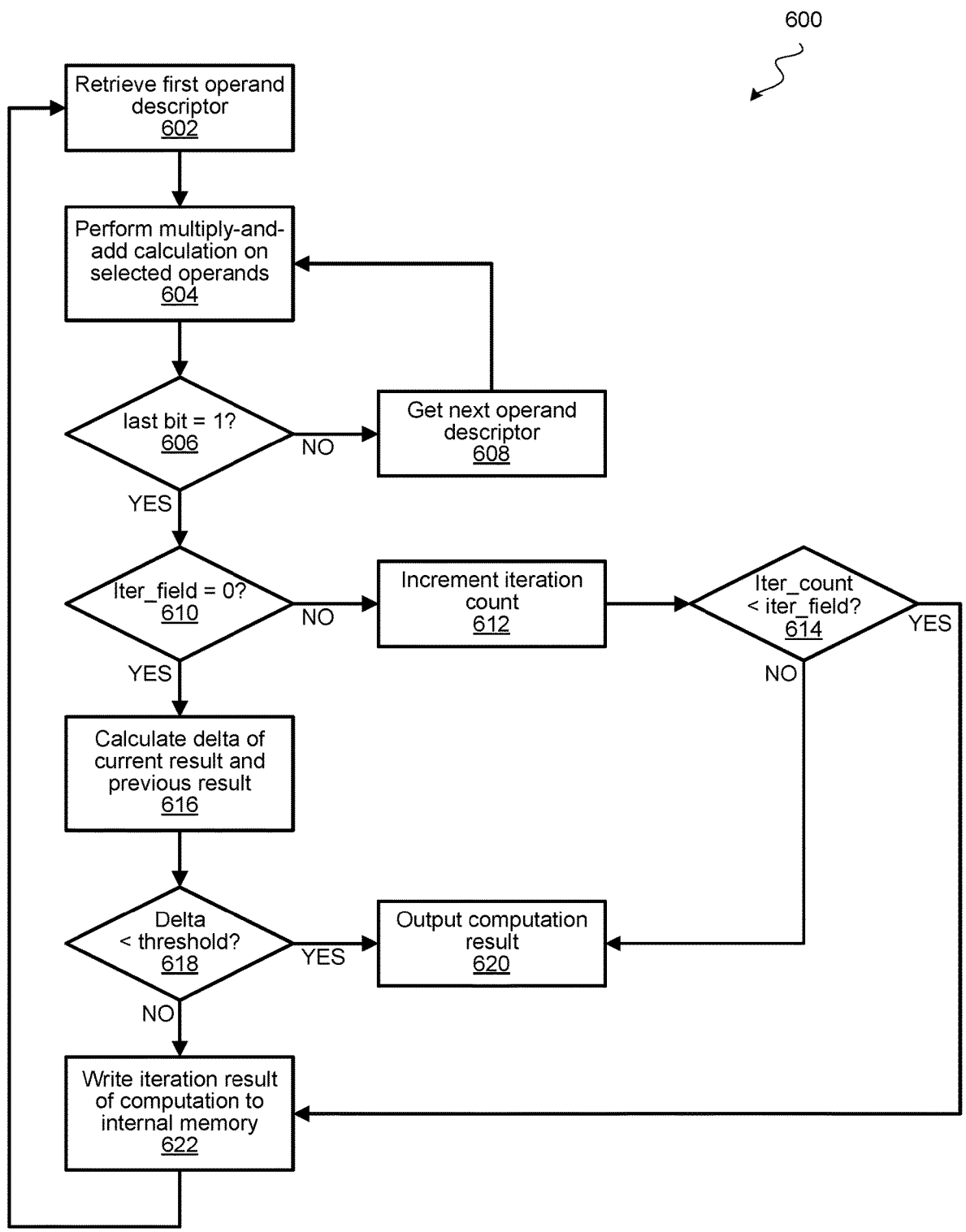
FIG. 6 illustrates a flow diagram of an example of a process to generate a computation result from operand descriptors.

FIG. 6 illustrates a flow diagram of a process 600 that can be used to process a set of operand descriptors from a meta-descriptor to generate a computation result. Process 600 can be used, for example, to perform block 504 of process 500. At block 602, the first operand descriptor is retrieved. The operand descriptor is used to select sources for operands to perform a multiply-and-add calculation. At block 604, the multiply-and-add calculation is performed on the selected operands. At block 606, the last bit of the current operand descriptor is checked to determine whether the operand descriptor being processed is the last operand descriptor. If the operand descriptor being processed is not the last operand descriptor of the meta-descriptor, then at block 608, the next operand descriptor is obtained. Process 600 then continues back to block 604 to perform the next multiply-and-add calculation using the current operand descriptor, and this repeats until all operand descriptors in the meta-descriptor are processed.

Referring back to block 606, if the last bit of the current operand descriptor indicates that the operand descriptor being processed is the last operand descriptor, then process 600 continues to block 610 to determine if the iteration field of the meta-descriptor indicates a target number of iterations to be performed or indicates auto-iteration mode. If the iteration field indicates a target number of iterations to perform, then at block 612, an iteration count value is incremented. At block 614, the updated iteration count value is compared with the target number of iterations in the iteration field of the meta-descriptor to determine if the updated iteration count value is less than the target number of iterations. If the updated iteration count value is less than the target number of iterations, then the current iteration result of the computation is written to internal memory at block 622, and the set of operand descriptors are processed again for the next iteration at block 602. If the updated iteration count value is not less than the target number of iterations, then the target number of iterations have been reached, and the current iteration result of the computation can be outputted as the computation result at block 620.

Referring back to block 610, if the iteration field indicates auto-iteration mode, then at block 616, the different or delta of the current iteration result and the previous iteration result is calculated. At block 618, the difference or delta is compared with a programmable threshold value to determine if the difference or delta is less than the threshold value. If the difference or delta is not less than the threshold value, then the current iteration result of the computation is written to internal memory at block 622, and the set of operand descriptors are processed again for the next iteration at block 602. If the difference or delta is less than the threshold value, than the current iteration result of the computation can be outputted as the computation result at block 620.

Figure 7:
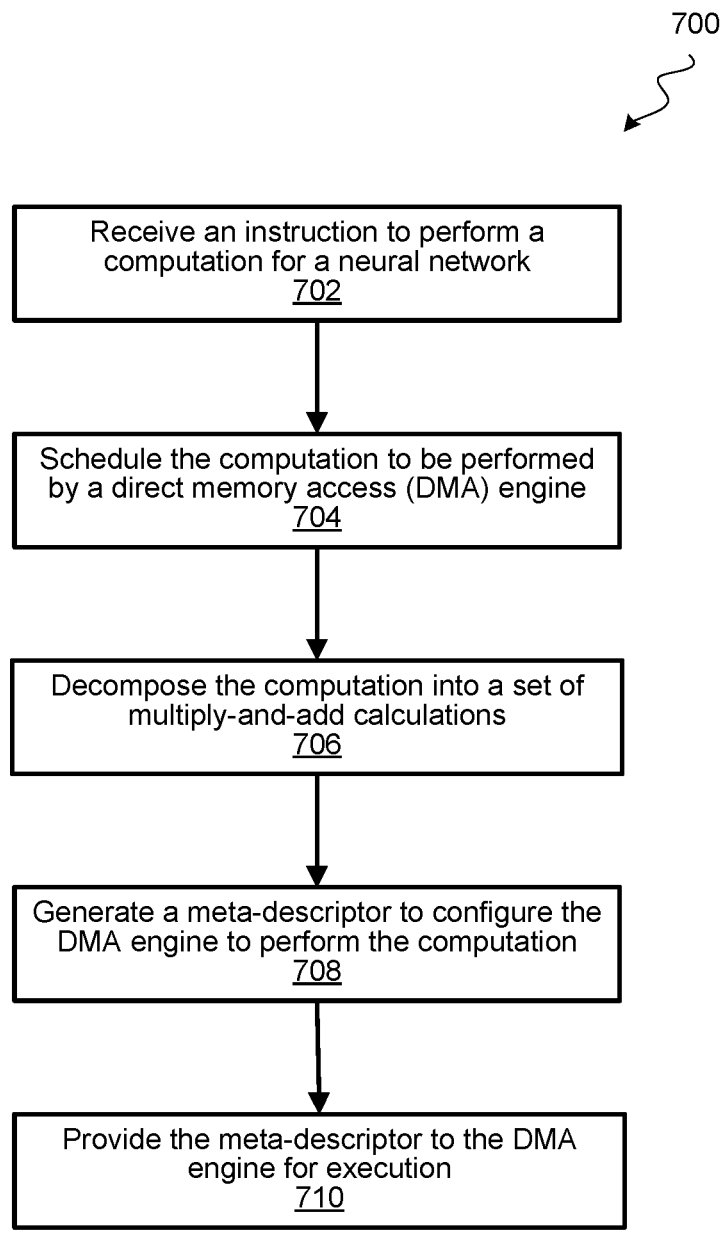
FIG. 7 illustrates a flow diagram of an example of a process to program a direct memory access engine.

FIG. 7 illustrates an example of a flow diagram of a process 700 that can be used to program a DMA engine to perform a computation. Process 700 can be performed, for example, by a data scheduler or other software component that control the data flow into and/or out of an integrated circuit device (e.g., accelerator) capable of performing neural network computations. In some implementations, process 700 can be implements as code stored in a computer-readable storage medium.

Process 700 may begin at block 702 by receiving an instruction to perform a computation for a neural network. The instruction to perform the computation can be part of the compiled code of a neural network model. By way of example, the computation can be a computation to compute a value for a forward pass or backward propagation of a training process, or can be a computation to compute a value for an inference operation.

At block 704, the computation can be scheduled to be performed by a direct memory access (DMA) engine. The computation can be scheduled based on the architecture of the neural network model (e.g., which layer of the neural network model that the computation belongs to), at what point during execution of the neural network that the input operands to the computation becomes available, and/or at what point during execution of the neural network that the result of the computation is used, etc.

At block 706, the computation is decomposed into a set of multiply-and-add calculations. In some implementations, the computations can be decomposed into an iterative series of multiply-and-add calculations, for example, by using Newton's stepping method. Examples of such decomposition of complex computations have been described above with reference to the reciprocal and square root computations.

At block 708, a meta-descriptor corresponding to the set of multiply-and-add calculations is generated. The meta-descriptor is used to configure the DMA engine to perform the computation. The meta-descriptor may include a set of operand descriptors, and each operand descriptor may correspond to one of the multiply-and-add calculation. An example of a meta-descriptor and examples of operand descriptors have been described above with reference to FIG. 4.

At block 710, the meta-descriptor is provided to the DMA engine for execution. For example, the meta-descriptor can be stored in a linked list in the DMA engine, and a memory descriptor used to initiate a data transfer via the DMA engine can reference the meta-descriptor such that the computation is perform on the data being transferred in the DMA engine.

Figure 8:
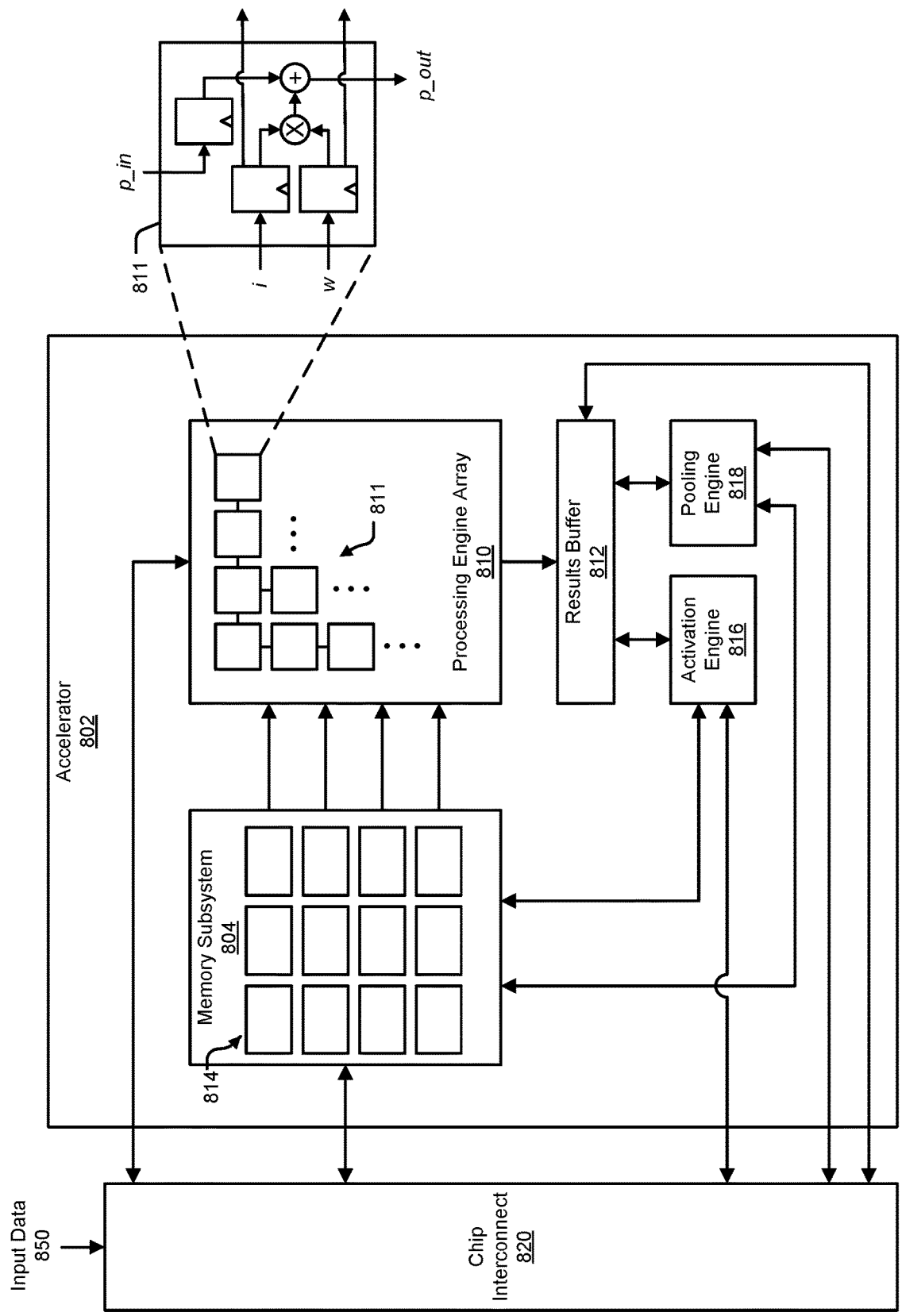
FIG. 8 illustrates a block diagram of an example of an integrated circuit device.

FIG. 8 is a block diagram illustrating an example of an integrated circuit device that can include an accelerator 802. In various examples, the accelerator 802, for a set of input data (e.g., input data 850), can execute computations using a processing engine array 810, an activation engine 816, and/or a pooling engine 818. In some examples, the example accelerator 802 may be an integrated circuit component of a processor, such as a neural network processor. The processor may have other integrated circuit components, including additional accelerator engines.

In various implementations, the memory subsystem 804 can include multiple memory banks 814. In these implementations, each memory bank 814 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 814. For example, each memory bank can be a physically separate memory component that has an address space that is separate and independent of the address spaces of each other memory bank. In this example, each bank may have at least one read channel and may have at least one separate write channel that can be used at the same time. In these examples, the memory subsystem 804 can permit simultaneous access to the read or write channels of multiple memory banks. As another example, the memory subsystem 804 can include arbitration logic such that arbitration between, for example, the outputs of multiple memory banks 814 can result in more than one memory bank's output being used. In these and other examples, though globally managed by the memory subsystem 804, each memory bank can be operated independently of any other.

Having the memory banks 814 be independently accessible can increase the efficiency of the accelerator 802. For example, values can be simultaneously read and provided to each row of the processing engine array 810, so that the entire processing engine array 810 can be in use in one clock cycle. As another example, the memory banks 814 can be read at the same time that results computed by the processing engine array 810 are written to the memory subsystem 804. In contrast, a single memory may be able to service only one read or write at a time. With a single memory, multiple clock cycles can be required, for example, to read input data for each row of the processing engine array 810 before the processing engine array 810 can be started.

In various implementations, the memory subsystem 804 can be configured to simultaneously service multiple clients, including the processing engine array 810, the activation engine 816, the pooling engine 818, and any external clients that access the memory subsystem 804 over a communication fabric 820. In some implementations, being able to service multiple clients can mean that the memory subsystem 804 has at least as many memory banks as there are clients. In some cases, each row of the processing engine array 810 can count as a separate client. In some cases, each column of the processing engine array 810 can output a result, such that each column can count as a separate write client. In some cases, output from the processing engine array 810 can be written into the memory banks 814 that can then subsequently provide input data for the processing engine array 810. As another example, the activation engine 816 and the pooling engine 818 can include multiple execution channels, each of which can be separate memory clients. The memory banks 814 can be implemented, for example, using static random access memory (SRAM).

In various implementations, the memory subsystem 804 can include control logic. The control logic can, for example, keep track of the address spaces of each of the memory banks 814, identify memory banks 814 to read from or write to, and/or move data between the memory banks 814. In some implementations, memory banks 814 can be hardwired to particular clients. For example, a set of memory banks 814 can be hardwired to provide values to the rows of the processing engine array 810, with one memory bank servicing each row. As another example, a set of memory banks can be hard wired to receive values from columns of the processing engine array 810, with one memory bank receiving data for each column.

The processing engine array 810 is the computation matrix of the example accelerator 802. The processing engine array 810 can, for example, execute parallel integration, convolution, correlation, and/or matrix multiplication, among other things. The processing engine array 810 includes multiple processing engines 811, arranged in rows and columns, such that results output by one processing engine 811 can be input directly into another processing engine 811. Processing engines 811 that are not on the outside edges of the processing engine array 810 thus can receive data to operate on from other processing engines 811, rather than from the memory subsystem 804.

In various examples, the processing engine array 810 uses systolic execution, in which data arrives at each processing engine 811 from different directions at regular intervals. In some examples, input data can flow into the processing engine array 810 from the left and weight values can be loaded at the top. In some examples weights and input data can flow from the left and partial sums can flow from top to bottom. In these and other examples, a multiply-and-accumulate operation moves through the processing engine array 810 as a diagonal wave front, with data moving to the right and down across the array. Control signals can be input at the left at the same time as weights, and can flow across and down along with the computation.

In various implementations, the number of columns in the processing engine array 810 determines the computational capacity of the processing engine array 810, and the number of rows determines the required memory bandwidth for achieving maximum utilization of the processing engine array 810. The processing engine array 810 can have, for example, 64 columns and 428 rows, or some other number of columns and rows.

An example of a processing engine 811 is illustrated in FIG. 8 in an inset diagram. As illustrated by this example, a processing engine 811 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 811.

In the illustrated example, an input from above can include a partial sum, p_in, provided either from another processing engine 811 or from a previous round of computation by the processing engine array 810. When starting a computation for a new set of input data, the top row of the processing engine array 810 can receive a fixed value for p_in, such as zero. As illustrated by this example, i and w are multiplied together and the result is summed with p_in to produce a new partial sum, p_out, which can be input into another processing engine 811. Various other implementations of the processing engine 811 are possible.

Outputs from the last row in the processing engine array 810 can be temporarily stored in the results buffer 812. The results can be intermediate results, which can be written to the memory banks 814 to be provided to the processing engine array 810 for additional computation. Alternatively, the results can be final results, which, once written to the memory banks 814 can be read from the memory subsystem 804 over the communication fabric 820, to be output by the system.

In some implementations, the accelerator 802 includes an activation engine 816. In these implementations, the activation engine 816 can combine the results from the processing engine array 810 into one or more output activations. For example, for a convolutional neural network, convolutions from multiple channels can be summed to produce an output activation for a single channel. In other examples, accumulating results from one or more columns in the processing engine array 810 may be needed to produce an output activation for a single node in the neural network. In some examples, activation engine 816 can be bypassed.

In various examples, the activation engine 816 can include multiple separate execution channels. In these examples, the execution channels can correspond to the columns of the processing engine array 810, and can perform an operation on the outputs of a column, the result of which can be stored in the memory subsystem 804. In these examples, the activation engine 816 may be able to perform between 1 and n parallel computations, where n is equal to the number of columns in the processing engine array 810. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 802 can include a pooling engine 818. Pooling is the combining of outputs of the columns of the processing engine array 810. Combining can include for example, computing a maximum value, a minimum value, an average value, a median value, a summation, a multiplication, or another logical or mathematical combination. In various examples, the pooling engine 818 can include multiple execution channels that can operating on values from corresponding columns of the processing engine array 810. In these examples, the pooling engine 818 may be able to perform between 1 and n parallel computations, where n is equal to the number of columns in the processing engine array 810. In various examples, execution channels of the pooling engine 818 can operate in parallel and/or simultaneously. In some examples, the pooling engine 818 can be bypassed.

Herein, the activation engine 816 and the pooling engine 818 may be referred to collectively as execution engines. The processing engine array 810 is another example of an execution engine. Another example of an execution engine is a Direct Memory Access (DMA) engine, which may be located outside the accelerator 802.

Input data 850 can arrive over the communication fabric 820. The communication fabric 820 can connect the accelerator 802 to other components of a processor, such as a DMA engine that can obtain input data 850 from an Input/Output (I/O) device, a storage drive, or a network interface. The input data 850 can be, for example one-dimensional data, such as a character string or numerical sequence, or two-dimensional data, such as an array of pixel values for an image or frequency and amplitude values over time for an audio signal. In some examples, the input data 850 can be three-dimensional, as may be the case with, for example, the situational information used by a self-driving car or virtual reality data. In some implementations, the memory subsystem 804 can include a separate buffer for the input data 850. In some implementations, the input data 850 can be stored in the memory banks 814 when the accelerator 802 receives the input data 850.

In some examples, the accelerator 802 can implement a neural network processing engine. In these examples, the accelerator 802, for a set of input data 850, can execute a neural network to perform a task for which the neural network was trained. Executing a neural network on a set of input data can be referred to as inference or performing inference.

The weights for the neural network can be stored in the memory subsystem 804, along with input data 850 on which the neural network will operate. The neural network can also include instructions, which can program the processing engine array 810 to perform various computations on the weights and the input data. The instructions can also be stored in the memory subsystem 804, in the memory banks 814 or in a separate instruction buffer. The processing engine array 810 can output intermediate results, which represent the outputs of individual layers of the neural network. In some cases, the activation engine 816 and/or pooling engine 818 may be enabled for computations called for by certain layers of the neural network. The accelerator 802 can store the intermediate results in the memory subsystem 804 for inputting into the processing engine array 810 to compute results for the next layer of the neural network. The processing engine array 810 can further output final results from a last layer of the neural network. The final results can be stored in the memory subsystem 804 and then be copied out to host processor memory or to another location.

Figure 9:
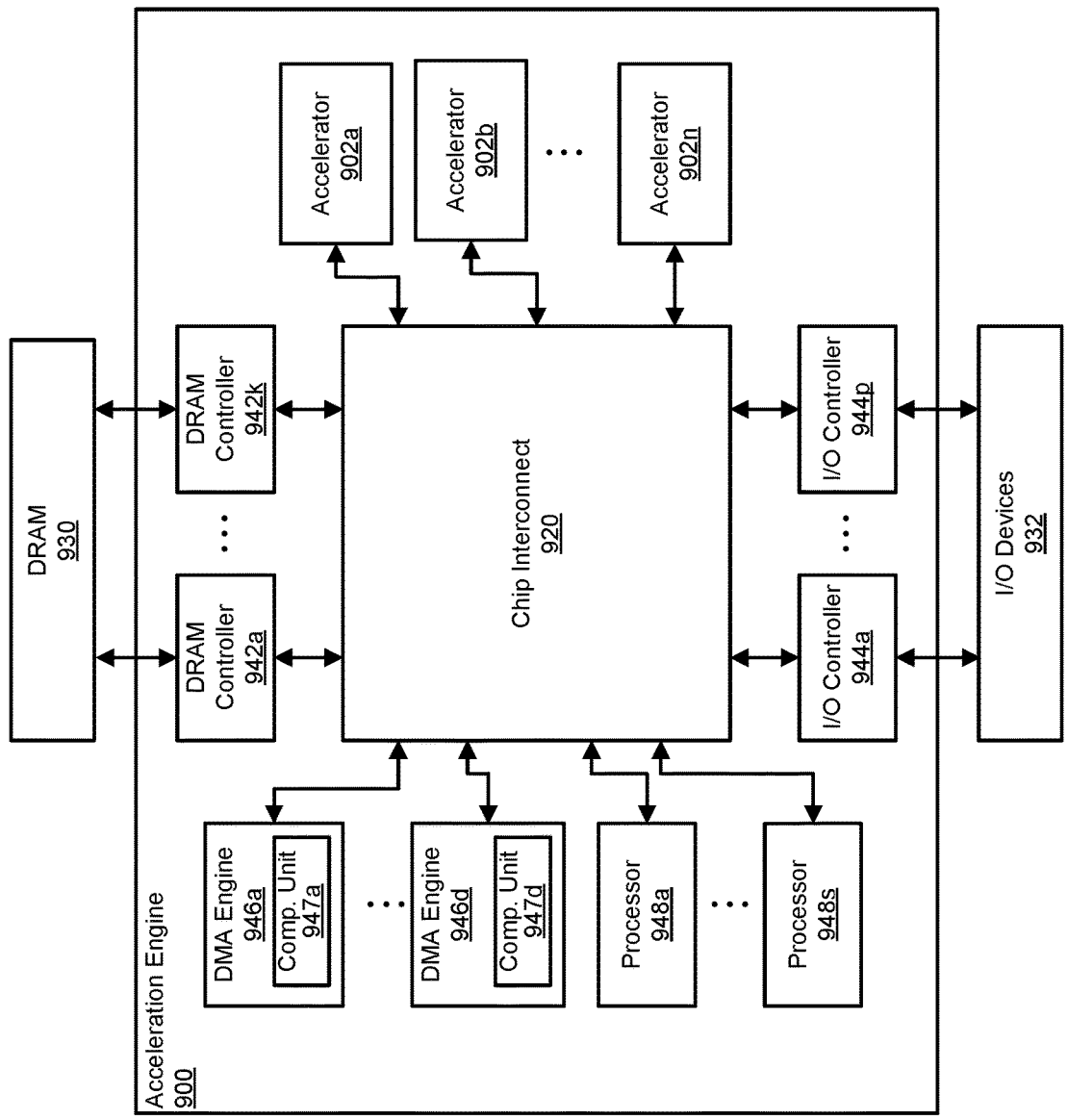
FIG. 9 illustrates a block diagram of an example of an acceleration engine.

FIG. 9 includes a block diagram that illustrates an example of an acceleration engine 900. The acceleration engine 900 is an example of an integrated circuit that can include one or more accelerators 902a-902n that may be similar to the accelerator illustrated in FIG. 8.

In the example of FIG. 9, the acceleration engine 900 includes multiple accelerators 902a-902n, each of which can perform a set of operations. In various examples, the accelerators 902a-902n are for particular types of operations, so that the accelerators 902a-902n can perform the operations much faster than when similar operations are performed by a general purpose processor. In various examples, to perform a set of operations, input data on which the operations are to be performed must first be moved into the accelerators 902a-902n. Additionally, in some cases, program code is also moved into the accelerators 902a-902n, which programs the operations that the accelerators 902a-902n will perform on the data. In the illustrated example, the acceleration engine 900 includes n accelerators 902a-902n. Examples of accelerators that can be included in the acceleration engine 900 include graphics accelerators, floating point accelerators, neural network accelerators, and others. In various examples, the accelerators 902a-902n can each be the same (e.g., each of the is a graphics accelerator) or can be different (e.g., the accelerators 902a-902n include a graphics accelerator, a floating point accelerator, and neural network accelerator).

The example acceleration engine 900 further includes DRAM controllers 942a-942k for communicating with an external memory. The external memory is implemented, in this example, using DRAM 930. In the illustrated example, the acceleration engine 900 includes k DRAM controllers 942a-942k, each of which may be able to communicate with an independent set of banks of DRAM. In other examples, other types of RAM technology can be used for the external memory. The DRAM controllers 942a-942k can also be referred to as memory controllers.

In various examples, input data and/or program code for the accelerators 902a-902n can be stored in the DRAM 930. Different programs can cause the accelerators 902a-902n to perform different operations. For example, when one of the accelerators is a neural network accelerator, one program can configure the neural network accelerator to perform speech recognition while another program can configure the neural network accelerator to perform image recognition. In various examples, different accelerators 902a-902n can be programmed with different programs, so that each performs a different set of operations. In various examples, the processors 948a-948s can manage moving of program code from the DRAM 930 to the accelerators 902a-902n.

The example acceleration engine 900 further includes I/O controllers 944a-944p for communicating with I/O devices 932 in the system. The acceleration engine 900 can communicate with I/O devices over, for example, a processor bus. In some examples, the processor bus can be implemented using Peripheral Component Interconnect (PCI) and/or a variation of the PCI bus protocol. The processor bus can connect the acceleration engine 900 to I/O devices such as, for example, input and output devices, memory controllers, storage devices, and/or network interface cards, among other things. In some examples, the I/O controllers 944-944p can enable the acceleration engine 900 to act as an I/O device for a host processor. For example, the acceleration engine 900 can be the recipient of input data from the host processor, and a command indicating an operation to be performed on the input data (e.g., a particular computation or analysis). In the illustrated example, the acceleration engine 900 includes p I/O controllers 944a-944p, each of which may include a separate root complex and may communicate with a separate set of I/O devices 932. In other examples, other standardized bus protocols, such as Ultra Path Interconnect (UPI) can be used for the host bus. In other examples, a proprietary bus protocol can be used.

Movement of data in the acceleration engine 900 can be managed by one or more processors 948a-948s, which can also be referred to as data management processors. In the example of FIG. 9, the acceleration engine 900 includes s processors 948a-948s incorporated into the device (e.g., on the same silicon die). In other examples, the processors 948a-948s can be external to the acceleration engine 900 (e.g., on a different die and/or in a different package). In some examples, the processors 948a-948s can manage the movement of data from I/O devices 932 to the accelerators 902a-902n or the DRAM 930. For example, input data may be located at an I/O device 932 or in processor memory, and the processors 948a-948s can move the input from the I/O device 932 or processor memory into an accelerator or into DRAM 930. As another example, program code for the accelerators 902a-902n may be located on an I/O device 932 or in processor memory.

The example acceleration engine 900 further includes DMA engines 946a-946d that can move data between the accelerators 902a-902n, DRAM controllers 942a-942k, and I/O controllers 944a-944p. DMA engines 946a-946d can be similar to the DMA engine shown in FIGS. 1-3, and each may include respective computation units 947a-947d. In the illustrated example, the acceleration engine 900 includes d DMA engines 946a-946d. In some implementations, the DMA engines 946a-946d can be assigned to specific tasks, such as moving data from the DRAM controllers 942a-942d to the accelerators 902a-902n, or moving data between the I/O controllers 944a-944p and the accelerators 902a-902n. These tasks can be assigned, for example, by enqueuing descriptors with the DMA engines 946a-946d, where a descriptor identifies an address for a block of data and an operation (e.g., a read or a write) to perform. A descriptor, for example, can direct a DMA engine to instruct a DMA controller to read a block of data from DRAM 930. A descriptor can, as a further example, instruct the DMA engine to write data, read by the DMA controller, to an accelerator. Further descriptors can be used to move data from an accelerator to DRAM 930.

In various examples, each of the processors 948a-948s can be responsible for managing the data movement for a different accelerator. In some examples, a processor may manage the data movement for more than one accelerator. Similarly, in various examples, each of the processors 948a-948s can be assigned to one or more DMA engines 946a-946d. In these and other examples, associations between processors 948a-948s, accelerators 902a-902n, and DMA engines 946a-946d are determined by program code being executed by each respective processor.

In the example acceleration engine 900, the various components can communicate over a chip interconnect 920. The chip interconnect 920 primarily includes wiring for routing data between the components of the acceleration engine 900. In some cases, the chip interconnect 920 can include a minimal amount of logic, such as multiplexors to control the direction of data, flip-flops for handling clock domain crossings, and timing logic.

Figure 10:
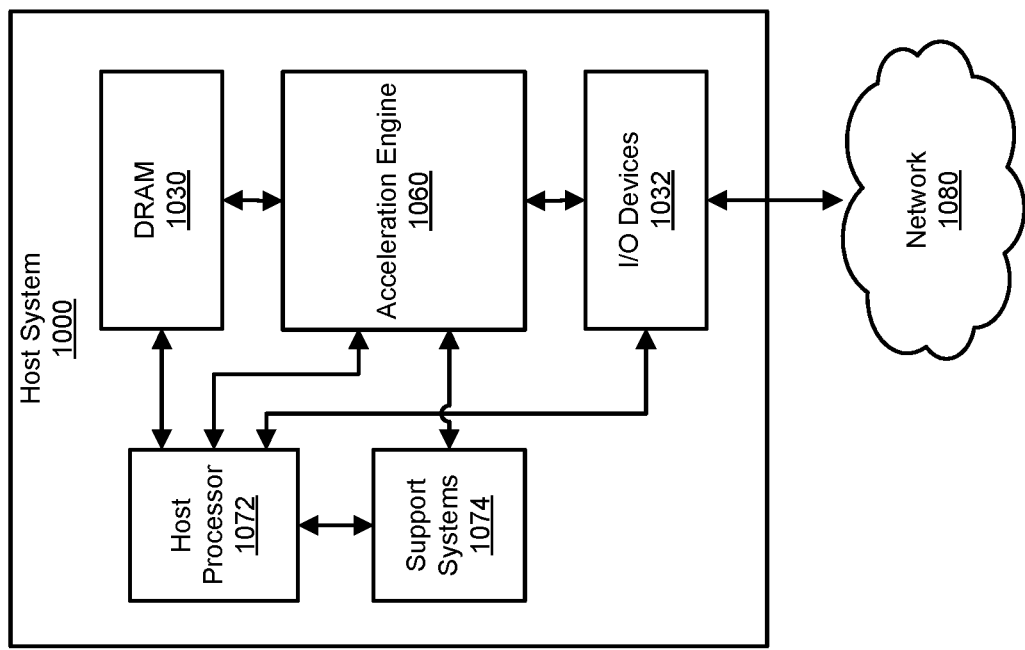
FIG. 10 illustrates a block diagram of an example of a host system.

FIG. 10 includes a block diagram that illustrates an example of a host system 1000 in which an acceleration engine 1060 can be used. The acceleration engine 1060 of FIG. 10 is an example of a device that can include one or more accelerators such as is illustrated in FIG. 9. The example host system 1000 of FIG. 10 includes the acceleration engine 1060, a host processor 1072, DRAM 1030 or processor memory, I/O devices 1032, and support systems 1074. In various implementations, the host system 1000 can include other hardware that is not illustrated here.

The host processor 1072 is a general purpose integrated circuit that is capable of executing program instructions. In some examples, the host processor 1072 can include multiple processing cores. A multi-core processor may include multiple processing units within the same processor. In some examples, the host system 1000 can include more than one host processor 1072. In some examples, the host processor 1072 and the acceleration engine 1060 can be one chip, such as, one or more integrated circuits within the same package.

In various examples, the host processor 1072 can communicate with other components in the host system 1000 over one or more communication channels. For example, the host system 1000 can include a host processor bus, which the host processor 1072 can use to communicate with the DRAM 1030, for example. As another example, the host system 1000 can include an I/O bus, such as a PCI-based bus, over which the host processor 1072 can communicate with the acceleration engine 1060 and/or the I/O devices 1032, for example. In various examples, the host system 1000 can, alternatively or additionally, include other communication channels or busses, such as serial busses, power management busses, storage device busses, and so on.

In some examples, software programs executing on the host processor 1072 can receive or generate input for processing by the acceleration engine 1060. In some examples, the programs can select an appropriate neural network to execute for a given input. For example, a program may be for language translation, and can select one or more neural networks capable of speech recognition and/or machine translation. In these and other examples, the programs can configure the acceleration engine 1060 with the neural network to execute, and/or can select a neural network processing engine on the acceleration engine 1060 that has previously been configured to execute the desired neural network. In some examples, once the acceleration engine 1060 has started an inference on input data, the host processor 1072 can manage the movement of data (such as weights, instructions, intermediate results, results of conditional layers, and/or final results) into or out of the acceleration engine 1060.

In some examples, a software program that is using the acceleration engine 1060 to conduct an inference can read the result from a conditional layer from the acceleration engine 1060 and/or from a storage location, such as in DRAM 1030. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 1030 is memory that is used by the host processor 1072 for storage of program code that the host processor 1072 is in the process of executing, as well as values that are being operated on. In some examples, the data for a neural network (e.g., weight values, instructions, and other data) can be all or partially stored in the DRAM 1030. DRAM is a common term for processor memory, and though DRAM is volatile memory, processor memory can be volatile and/or non-volatile. Though not illustrated here, the host system 1000 can include other volatile and non-volatile memories for other purposes. For example, the host system 1000 can include a Read-Only Memory (ROM) that stores boot code for booting the host system 1000 at power on, and/or Basic Input/Output System (BIOS) code.

Though not illustrated here, the DRAM 1030 can store instructions for various programs, which can be loaded into and be executed by the host processor 1072. For example, the DRAM 1030 can be storing instructions for an operating system, one or more data stores, one or more application programs, one or more drivers, and/or services for implementing the features disclosed herein.

The operating system can manage and orchestrate the overall operation of the host system 1000, such as scheduling tasks, executing applications, and/or controller peripheral devices, among other operations. In some examples, a host system 1000 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 1000. For example, some drivers can provide communication between the operating system and peripheral devices or I/O devices 1032. Alternatively or additionally, some drivers may provide communication between application programs and the operating system, and/or application programs and peripheral devices accessible to the host system 1000. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 1032 can include hardware for connecting to user input and output devices, such as keyboards, mice, pens, tablets, voice input devices, touch input devices, displays or monitors, speakers, and printers, among other devices. The I/O devices 1032 can also include storage drives and/or network interfaces for connecting to a network 1080. For example, the host system 1000 can use a network interface to communicate with storage devices, user terminals, other computing devices or servers, and/or other networks, among various examples.

In various examples, one or more of the I/O devices 1032 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 1000 or may be in an external enclosure. A storage device can be fixed (e.g., attached by screws) or removable (e.g., having a physical release mechanism and possibly a hot-plug mechanism).

Storage devices, the DRAM 1030, and any other memory component in the host system 1000 are examples of computer-readable storage media. Computer-readable storage media are physical mediums that are capable of storing data in a format that can be read by a device such as the host processor 1072. Computer-readable storage media can be non-transitory. Non-transitory computer-readable media can retain the data thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 1032 can be PCI-based devices. In these examples, a PCI-based I/O device includes a PCI interface for communicating with the host system 1000. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 1074 can include hardware for coordinating the operations of the acceleration engine 1060. For example, the support systems 1074 can include a microprocessor that coordinates the activities of the acceleration engine 1060, including moving data around on the acceleration engine 1060. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 1072. In some examples, the program executed by the microprocessor is stored on the hardware of microprocessor, or on a non-volatile memory chip in the host system 1000. In some examples, the microprocessor and the acceleration engine 1060 can be on chip, such as one integrated circuit on the same die and in the same package.

In some examples, the support systems 1074 can be responsible for taking instructions from the host processor 1072 when programs executing on the host processor 1072 request the execution of a neural network. For example, the host processor 1072 can provide the support systems 1074 with a set of input data and a task that is to be performed on the set of input data. In this example, the support systems 1074 can identify a neural network that can perform the task, and can program the acceleration engine 1060 to execute the neural network on the set of input data. In some examples, the support systems 1074 only needs to select an appropriate neural network processing engine of the neural network processor. In some examples, the support systems 1074 may need to load the data for the neural network onto the acceleration engine 1060 before the acceleration engine 1060 can start executing the neural network. In these and other examples, the support systems 1074 can further receive the output of executing the neural network, and provide the output back to the host processor 1072.

In some examples, the operations of the support systems 1074 can be handled by the host processor 1072. In these examples, the support systems 1074 may not be needed and can be omitted from the host system 1000.

In various examples, the host system 1000 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 1000 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computing system comprising:
   system memory;
   a neural network accelerator including a systolic array and a state buffer configured to store input data for the systolic array; and
   a direct memory access (DMA) engine configured to exchange data between the system memory and the neural network accelerator, the DMA engine including:
      a computational circuit block configured to generate a computation result using data read from the system memory for placement into the state buffer of the neural network accelerator, the computational circuit block including:
         an operand selector circuit configured to select a corresponding source from a plurality of sources for a first operand, a second operand, and a third operand based on a meta-descriptor of a computation;
         a multiply-and-add circuit configured to multiply the first operand with the second operand to generate a multiplication result, and add the multiplication result to the third operand; and
         a control circuit configured to output a computation result after a number of iterations of the computation using the multiply-and-add circuit has been performed.

2. The computing system of claim 1, wherein the computational circuit block further includes a threshold comparator circuit configured to determine whether a difference between a previous iteration result of the computation and a current iteration result of the computation is less than a programmable threshold.

3. The computing system of claim 1, wherein a source for each of the first operand, the second operand, and the third operand is selectable from an input buffer, a constant value buffer, or an internal memory of the computational circuit block.

4. The computing system of claim 1, wherein the neural network accelerator further includes a result buffer configured to store output data of the systolic array, and the DMA engine includes another computational circuit block configured to generate a computation result using data read from the result buffer for placement into the system memory.

5. A direct memory access engine comprising:
   a calculation circuit operable to perform a multiply-and-add calculation on a set of operands;
   an operand selector circuit operable to select a source from a plurality of sources for each operand of the calculation circuit; and
   a control circuit operable to:
      retrieve a meta-descriptor for performing a computation;
      configure the operand selector circuit based on the meta-descriptor; and
      use the calculation circuit to perform a number of iterations of the computation based on the meta-descriptor to generate a computation result.

6. The direct memory access engine of claim 5, wherein the plurality of sources includes an input buffer, a constant value buffer, and an internal memory.

7. The direct memory access engine of claim 6, wherein the operand selector circuit includes sign inversion logic to invert a sign of a value stored in the input buffer or in the internal memory.

8. The direct memory access engine of claim 5, wherein each iteration of the computation includes a plurality of multiply-and-add calculations.

9. The direct memory access engine of claim 6, wherein the input buffer is updated with a calculation result of the calculation circuit after each multiply-and-add calculation of the computation.

10. The direct memory access engine of claim 8, wherein the meta-descriptor provides an operand descriptor for each of the plurality of multiply-and-add calculations.

11. The direct memory access engine of claim 10, wherein each operand descriptor includes a first operand selector for a first operand of the calculation circuit, a second operand selector for a second operand of the calculation circuit, and a third operand selector for a third operand of the calculation circuit.

12. The direct memory access engine of claim 11, wherein each operand descriptor includes a bit indicating whether the operand descriptor is a last operand descriptor of the meta-descriptor.

13. The direct memory access engine of claim 5, wherein the meta-descriptor includes an iteration field providing information on the number of iterations of the computation to perform.

14. The direct memory access engine of claim 13, wherein a zero value in the iteration field indicates an auto-iteration mode in which the computation is iteratively performed until a difference between a previous iteration result of the computation and a current iteration result of the computation satisfies a threshold.

15. The direct memory access engine of claim 13, wherein a non-zero value in the iteration field indicates the number of iterations of the computation to perform.

16. The direct memory access engine of claim 5, wherein the direct memory access engine is communicatively coupled between system memory and an accelerator.

17. A non-transitory computer-readable medium storing code, which when executed by one or more processors, causes the one or more processors to perform operations including:
    receiving an instruction to perform a computation for a neural network;
    scheduling the computation to be performed by a direct memory access (DMA) engine;
    decomposing the computation into a set of multiply-and-add calculations;
    generating a meta-descriptor corresponding to the set of multiply-and-add calculations to configure the DMA engine to perform the computation; and
    providing the meta-descriptor to the DMA engine.

18. A method comprising:
    obtaining, by a direct memory access (DMA) engine, a memory descriptor including a source address, a destination address, and a meta-descriptor for generating a computation result on data read from the source address, the meta-descriptor including a set of operand descriptors to perform a computation involving a plurality of multiply-and-add calculations, and an iteration field to control a number of iterations of the computation to perform;
    performing, by the DMA engine, the number of iterations of the computation to generate the computation result, wherein each iteration of the computation is performed by:
        for each of the plurality of multiply-and-add calculations:
            selecting a source for each operand of a multiply-and-add circuit based on an operand descriptor for the corresponding multiply-and-add calculation; and
            performing the corresponding multiply-and-add calculation on the operands of the multiply-and-add circuit; and
    writing, by the DMA engine, the computation result to the destination address after performing the number of iterations of the computation.

19. The method of claim 18, wherein the computation is iteratively performed until a difference between a previous iteration result of the computation and a current iteration result of the computation satisfies a threshold.

20. The method of claim 18, wherein the source address and the destination address include a first address corresponding to a location in a dynamic random access memory of a system memory and a second address corresponding to a location in a buffer of a neural network accelerator.

* * * * *